United States Patent [19]
Wallrafen

[11] Patent Number: 5,157,312
[45] Date of Patent: Oct. 20, 1992

[54] DEVICE INCLUDING WETNESS SENSOR FOR CONTROLLING A WINDSHIELD WIPER

[75] Inventor: Werner Wallrafen, Sulzbach, Fed. Rep. of Germany

[73] Assignee: VDO Adolf Schindling AG, Frankfurt am Main, Fed. Rep. of Germany

[21] Appl. No.: 601,936

[22] Filed: Oct. 22, 1990

[30] Foreign Application Priority Data

Dec. 2, 1989 [DE] Fed. Rep. of Germany ....... 3939938

[51] Int. Cl.$^5$ .............................................. B60S 1/00
[52] U.S. Cl. .................................. 318/264; 15/250.17; 318/446; 318/483; 318/DIG. 2
[58] Field of Search ............ 15/250 C, 250.12, 250.13, 15/250.17; 312/443, 444, DIG. 2, 483, 264, 62, 446

[56] References Cited

U.S. PATENT DOCUMENTS

| | | | |
|---|---|---|---|
| Re. 33,308 | 8/1990 | Millerd et al. | 318/444 |
| 3,794,847 | 2/1974 | Cadiou | 15/250 C |
| 4,131,834 | 12/1978 | Blaszkowski | 318/483 |
| 4,495,452 | 1/1985 | Boegh-Peterson | 318/DIG. 2 |
| 4,703,237 | 10/1987 | Hochstein | 318/483 |
| 4,740,735 | 4/1988 | Hayashi | 318/483 |
| 4,992,671 | 2/1991 | Gille et al. | 318/DIG. 2 |
| 5,017,847 | 5/1991 | Leistenschneider | 318/443 |

*Primary Examiner*—A. Jonathan Wysocki
*Attorney, Agent, or Firm*—Martin A. Farber

[57] ABSTRACT

In a device for controlling a windshield wiper, in particular on a motor vehicle, the windshield wiper is switched on when a sensor indicates wetness above a preset threshold value. The windshield wiper can furthermore be turned on by a manually actuatable switch. The threshold value is reduced upon actuation of the switch.

6 Claims, 2 Drawing Sheets

DEVICE INCLUDING WETNESS SENSOR FOR CONTROLLING A WINDSHIELD WIPER

FIELD AND BACKGROUND OF THE INVENTION

The present invention relates to a device for controlling a windshield wiper, in particular on a motor vehicle.

Devices for controlling windshield wipers are known in which the windshield-wiper motor starts up automatically when a predetermined threshold for the wetting of the windshield by rain is exceeded. Various sensors are known in order to recognize the wetting of the windshield. Furthermore in the known devices the threshold value is predetermined as a fixed value or as variable in steps.

The specific sensor used however supplies, in cooperation together with a threshold value circuit, a signal which does not sufficiently reflect the extent to which visibility is impaired at the time. This impairment depends on many, in part, subjective factors. Thus, for instance, the individual visual acuity and the other viewing conditions play a decisive role. Raindrops have a much more disturbing effect at night than during the day, due to dazzle by oncoming vehicles. Vision is furthermore affected to varying extents by the size of the raindrops, by the surface tension and by the degree of the dirtiness of the windshield. Finally, sensor-induced changes reduce the importance of the sensor signal as measurement of the visibility. Such changes comprise, for instance, temperature dependence and aging processes, manufacturing tolerances and the conductivity of the rain in the case of capacitive and resistive sensor systems.

FIELD AND BACKGROUND OF THE INVENTION

It is an object of the present invention to adapt a basically moisture-dependent control for the windshield wiper to the visibility prevailing at the time.

According to the invention, the windshield wiper is switched on if a sensor (I) indicates wetness above a predetermined threshold value, the windshield wiper can furthermore be switched on and off by a manually actuated control switch (6) and the threshold value is adopted or reduced upon actuation of the control switch (6).

As a result of the measures of the invention, the control of the windshield wiper is adapted in a simple manner to the viewing conditions perceived by the driver of the vehicle. The attention of the driver is required only to a small extent. For a reduction of the sensitivity in the switching on of the windshield wiper there is merely required a movement by the driver which he is, in any event, accustomed to carry out in the case of impairment in windshield view due to a wet windshield.

A premature manual switching of the wiper on has the result that the sensitivity to response is increased. The sensitivity can, however, be reduced such that the windshield wiper is turned off until the wetting by the rain requires that it be switched on again.

According to a further feature of the invention, the threshold value is reduced upon actuation of the switch (6) to approximately the output voltage given off by the sensor at the moment.

Another feature of the invention provides that, after the switching on of the device, the threshold value assumes a value which is equal to or somewhat less than the output voltage given off by the sensor (1) at the time of the switching on.

These further developments assure that the windshield wiper is switched on again upon a degree of wetting at which the driver previously considered it necessary to turn the windshield wiper on.

In accordance with another feature, it is proposed that upon the switching on of the device after a lengthy period of time, the threshold value assumes the threshold value last present, which has been stored.

Finally, another feature provides that when the device is turned on again, the threshold value, after a short period of time, assumes a value which lies approximately at the output voltage given off at the time by the sensor.

One advantageous embodiment of the invention provides that a microcomputer (5) is provided, having a program which regularly interrogates the sensor (1) and the switch (6), switches the windshield wiper on or off upon the exceeding of the threshold value and upon actuation of the switch (6), and, upon actuation of the switch (6), adjusts the threshold value as a function of the existing sensor signal.

BRIEF DESCRIPTION OF THE DRAWING

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
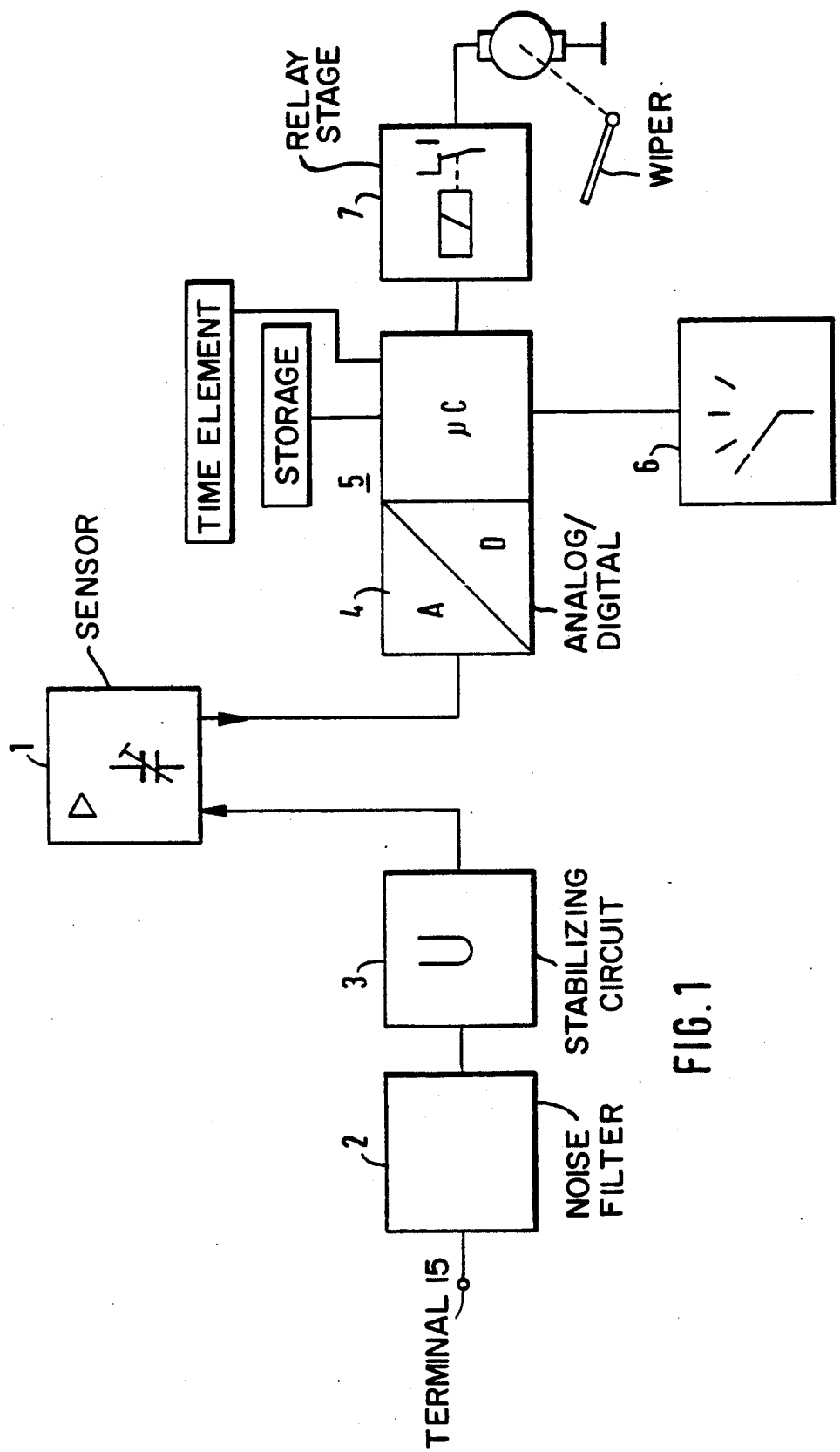
FIG. 1 is a block diagram of a device in accordance with the invention.

In the device shown in FIG. 1, the degree of wetness of the windshield is determined by means of a capacitive sensor 1 to which operating voltage is fed via the terminal 15 of the vehicle's electrical system, via a noise filter 2 and a stabilizing circuit 3. Capacitive, if desired, the noise filter 2 may include a zener diode clamp circuit (not shown), moisture sensors are known per se and need not be explained in greater detail for an understanding of the present invention. An amplifier is associated with the sensor 1 so that the output voltage of the sensor is fed directly to an analog-digital converter 4 of a so-called single-chip microcomputer 5. The microcomputer 5 is connected to a control switch 6 which is preferably developed as steering column switch and has detent positions for continuous operation and automatic operation as well as an initial position for one-time wiping. Via a relay stage 7, the motor 8 of a windshield wiper is connected to an output of the microcomputer 5.

Figure 2:
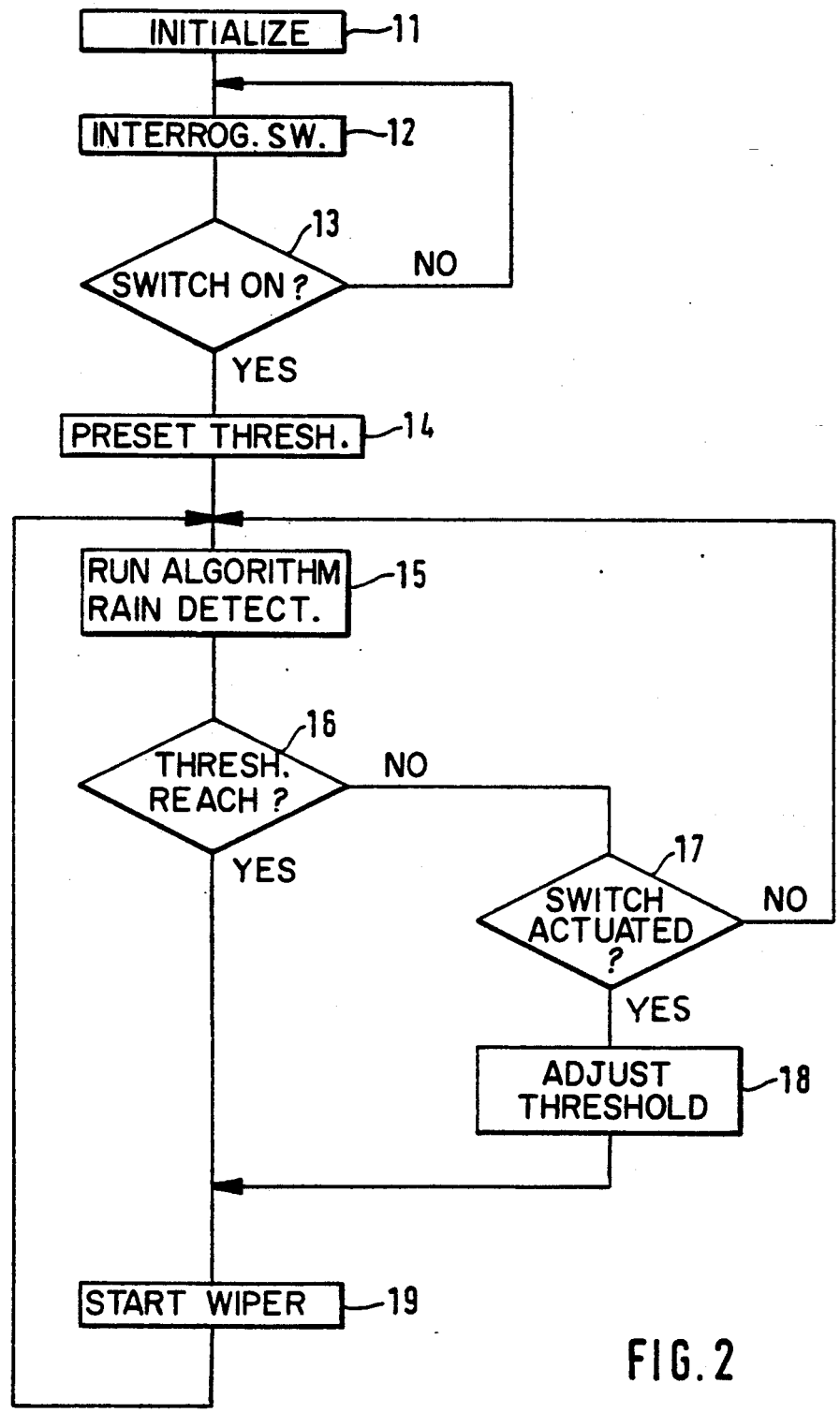
FIG. 2 is a flow chart of a program provided for the microcomputer in the device of FIG. 1.

The program shown in FIG. 2 is initialized at 11 and interrogates the position of the switch 6 at 12. A branching 13 then takes place, depending on whether the switch is in the QN-position (automatic operation). As long as this is not the case, the program parts 12 and 13 are passed through in the form of a loop. As soon as switching on takes place, the establishing of the threshold value takes place at 14. This can be effected, for instance, in the manner that the threshold value is read out from a read-only memory. It is, however, also possible to use as threshold value the output voltage of the sensor which is present at the time of switching-on — possibly a value which is somewhat below the output voltage.

At 15, the threshold value is compared with the actual output voltage. Depending on the result of the comparison, a branching 16 takes place. If the threshold value is not reached, interrogation takes place at 17 as to whether the switch 6 has been actuated in the meantime. If this is not the case then program part 15 is repeated. However, if the switch 6 has been actuated in the meantime, then the threshold value is adjusted in the program part 18 as a function of the output signal of the sensor 1 at the time. The windshield wiper is then started at 19. If it is noted at 15 that the output signal of the sensor is already greater than the threshold value, then, after the branching 16, the windshield wiper motor is started directly (19), without interrogation of the switch taking place.

In order to distinguish whether a switching off and switching on again takes place because of a change in the threshold value or because there has not been any rain for a certain period of time, a time element can be provided. If the device is switched off only briefly or if the switch is only briefly brought into the OFF-position, then a threshold value is established which is equal to or slightly below the output signal of the sensor at that time. However, if the device remains turned off for a longer period of time, then a threshold value which was entered in a memory is set upon the switching on again.

I claim:

1. A device for controlling a windshield wiper, suitable for a motor vehicle, the device comprising
   a sensor of windshield wetness, and a manually actuated switch; and
   a computer, the computer being coupled to the sensor and the switch, and outputting a control signal for driving a windshield wiper; and
   wherein the computer is operative to activate the windshield wiper if the sensor indicates wetness above a predetermined threshold value;
   the windshield wiper can be activated by the manually actuated switch; and
   the threshold value is reduced upon actuation of the switch.

2. A device according to claim 1, wherein
   said threshold value is reduced upon actuation of the switch to approximately the output voltage given off by said sensor.

3. A device according to claim 1, wherein
   after an activation of the device, a threshold value selected by the computer assumes a value which is equal to or less than the output voltage given off by said sensor at the time of the activation of the device.

4. A device according to claim 3, wherein
   upon an actuation of the device after a predetermined period of time, a threshold value selected by the computer assumes the threshold value last present, which has been stored.

5. A device according to claim 3, wherein
   upon a further activation of the device, a threshold value selected by the computer, after a predetermined period of time, assumes a value which lies approximately at an output voltage given off, at the time, by the sensor.

6. A device according to claim 1, wherein
   said computer operates in response to a program to regularly interrogate said sensor and said switch;
   said computer switches the windshield wiper on or off upon the exceeding of a threshold value by said wetness indicated by said sensor, and upon actuation of the switch; and
   in response to a setting of the switch, said computer adjusts the threshold value as a function of an existing sensor signal.

* * * * *